June 13, 1961 A. G. SAMUSENKO 2,988,734

MAGNETIC MEMORY SYSTEMS

Filed Feb. 24, 1959 2 Sheets-Sheet 1

INVENTOR.
ANATOL G. SAMUSENKO

BY

Milton S. Winters

ATTORNEY

INVENTOR.
ANATOL G. SAMUSENKO
BY
Milton S. Winters
ATTORNEY

United States Patent Office 2,988,734
Patented June 13, 1961

2,988,734

MAGNETIC MEMORY SYSTEMS

Anatol G. Samusenko, Camden, N.J., assignor to Radio Corporation of America, a corporation of Delaware Filed Feb. 24, 1959, Ser. No. 795,084
14 Claims. (Cl. 340—174)

This invention relates generally to memory systems using magnetic elements, and in particular to frequency control systems.

The operating frequency of an oscillatory circuit can be varied by changing the effective inductance of a magnetic element linked by the oscillatory circuit. When a multi-apertured magnetic element having a rectangular hysteresis loop is used, the effective inductance seen by the oscillatory circuit can be changed by applying an electrical signal of finite duration through one of the apertures. The use of such a multi-apertured element in controlling the frequency of an oscillatory circuit is described in my copending application Serial No. 718,160 filed February 28, 1958. Once set, the oscillatory circuit continues to operate at the frequency determined by that electrical signal until a different electrical signal is applied to change the oscillatory circuit to a different frequency. The term "frequency" is used herein to designate the number of cycles per second of an alternating signal, or the repetition rate of a pulse type signal including step-type or D.C. (direct current) signals.

In practice, it is found that the frequency of the oscillatory circuit shifts somewhat at the time of the removal of the applied control signal. This shift in frequency is believed due to the non-ideal hysteresis characteristics of practical magnetic elements. One method of controlling the amount of such undesired frequency shift is to regulate, for example, the amplitude of the control signals.

In certain applications, these frequency control systems may be used as the storage portion of a system using analog signals. In these applications, the circuit frequency corresponds to the stored analog information. The non-ideal hysteresis characteristics may be compensated in analog systems of relatively high accuracy by feeding back a suitable signal to force the element to change in a direction to make the difference between the desired and actual oscillatory circuit frequency equal to zero. It is desirable, however, to be able to obtain the desired accuracy without requiring the use of additional feedback circuitry.

It is an object of the present invention to provide improved control systems using magnetic elements.

Another object of the present invention is to provide improved frequency control systems using magnetic elements.

Still another object of the present invention is to provide improved frequency control systems wherein the oscillatory circuit frequency remains substantially constant even after removal of the control signals, and in which the control signals need not be as closely regulated as in certain prior frequency control systems.

A further object of the invention is to provide an improved system useful in the storage of analog signals.

According to the present invention, a control system has an oscillatory circuit coupled in regenerative fashion to a plurality of multi-apertured magnetic elements. A circuit for receiving control signals is also coupled to the magnetic elements. During operation, each new control signal applied to the elements together with the signals generated by the oscillatory circuit itself causes the oscillatory circuit to assume a desired operating frequency. The control and oscillatory circuits are wound in complementary fashion to the elements such that the control and oscillatory signals aid each other in one or more of the elements and oppose each other in the remaining ones of the elements. Upon removal of the control signal, the oscillatory circuit remains at or close to the desired frequency. The control signals may be D.C. signals, unipolar or bipolar pulse type signals, or continuous wave type alternating current signals.

In certain embodiments of the invention separate pairs of coils are used to link the oscillatory circuit and the magnetic elements; in other embodiments, a single pair of coils is used to link the oscillatory circuit and the elements.

Figure 1:
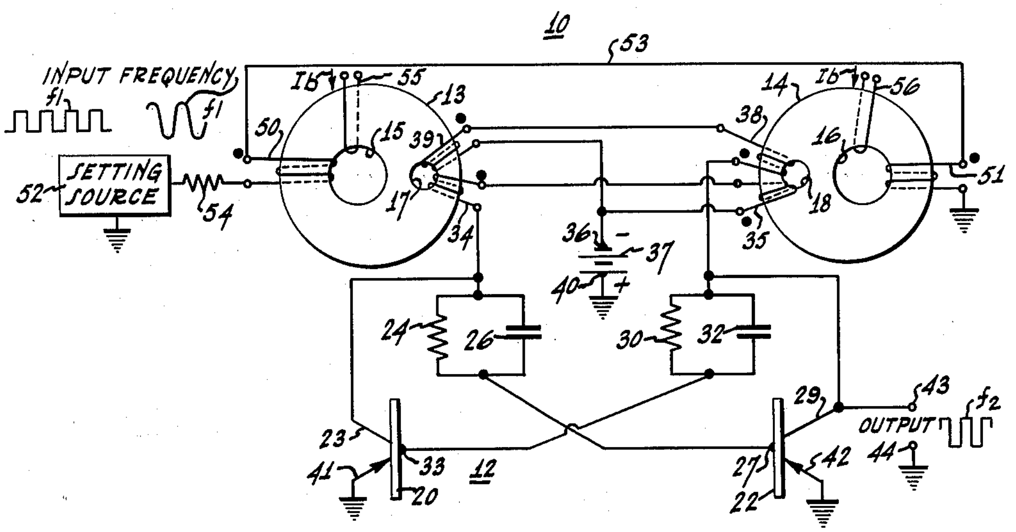
FIG. 1 is a schematic diagram of a control system according to the invention.

The control system 10 of FIG. 1 includes an oscillatory circuit 12 interconnected with a plurality, for example a pair, of multi-apertured, magnetic elements 13 and 14. Each of the elements 13 and 14 is made of magnetic material which exhibits an appreciable amount of remanent flux. A material having a Bs/Br ratio of say, .60 or better, is considered to be one having an appreciable remanent flux for the purposes of this invention.

The elements 13, 14, for example, may be two-apertured transfluxors, described in an article by J. A. Rajchman and A. W. Lo, entitled "The Transfluxor," and published in the March, 1956 Proceedings of the I.R.E., pages 321–332. Transfluxors, for example, provide the appreciable remanent flux due to the rectangular hysteresis loop material used. However, other materials such as those having an "S" type hysteresis characteristic also provide the desired appreciable remanent flux. For convenience of description, tthe elements 13 and 14 are referred to hereinafter as transfluxors. Each of the transfluxors 13 and 14 has a relatively large diameter setting aperture 15, 16 respectively, and a relatively small diameter output aperture 17, 18, respectively. The two apertures provide three separate legs in the material. The wide leg, between the periphery of the transfluxor and the inner surface of the larger diameter setting aperture, has a cross-sectional area at least equal to the sum of the cross-sectional areas of the other two narrow legs located on either side of the small diameter output aperture. Preferably, the two narrow legs are of equal cross-sectional area.

The oscillator 12 is a free-running, symmetrical multivibrator circuit and includes a first stage having a PNP transistor 20 and a similar second stage having a PNP transistor 22. Other forms of oscillatory circuits may be used in the control system 10. In general, any oscillator, transistor, or tube-type using inductive feedback, may be used in place of the oscillator 12 of FIG. 1. In the case of the tube-type oscillatory circuits, however, transfluxors having relatively larger volume of magnetic material are provided in order to produce the relatively larger induced voltages required in driving the tubes.

The collector electrode 23 of the first stage transsistor 20 is cross-coupled by means of the parallel combination of a resistor 24 and a capacitor 26 to the base electrode 27 of the second stage transistor 22. The collector electrode 29 of the second-stage transistor 22 is similarly cross-coupled by means of the parallel combination of a resistor 30 and a capacitor 32 to the base electrode 33 of the first stage transistor 20. The collector electrode 23 of the first-stage transistor 22 also is connected in series with a pair of first control windings 34 and 35 to the negative terminal 36 of a bias source, such as a battery 37. The first control windings 34 and 35 are wound through the output apertures 17 and 18 respectively of the first and second transfluxors 13 and 14. The collector electrode 29 of the second stage transistor 22 also is connected in series with a second pair of control windings 38 and 39 respectively wound through the output apertures 17 and 18 of the transfluxors 13 and 14 to the negative battery terminal 36. The positive battery terminal 40 is connected to a common point of reference potential, indicated in the drawing by the conventional ground symbol. The emitter electrodes 41, 42 of the transistors 20 and 22 are each connected to ground.

The output of the oscillator circuit 12 may be taken across a pair of output terminals 43, 44 coupled between the collector electrode 29 of the transistor 22 and ground. If desired, output signals also may be taken between the collector electrode 23 and ground of the first transistor 20. The output terminals 43, 44 may be coupled to any suitable utilization device, not shown.

The flux in the transfluxors 13 and 14 is set to a desired level by means of setting windings 50, 51 respectively linking the setting aperatures 15 and 16. The setting windings 50, 51 are connected in series with each other in a series circuit 53. The series circuit 53 is connected to a setting source 52 arranged to apply desired setting signals to the transfluxors 13 and 14. A current limiting resistor 54 preferably is connected in series between the setting source 52 and the setting windings 50, 51 when the setting source 52 is of the constant-voltage type. However, the setting source 52 may be a constant-current source, or a constant-flux source. Each of these different type sources is known in the art.

The conventional dot notation is used to indicate the senses in which the various windings are linked to the transfluxors. In the circuit exemplified in FIG. 1, the setting windings 50, 51 are shown connected in series-opposing relation to each other. The first pair of control windings 34 and 35 are connected in series-aiding relation to each other, as are the second pair of control windings 38, 39. The first and second control windings 34 and 39, however, are linked to the transfluxors 13 in mutually opposite senses, as are the first and second control windings 35 and 38 on the second transfluxor 14.

The well-known right-hand rule may be used to determine the sense in which flux flow is produced in a transfluxor as a result of a positive, conventional current applied to one of the windings linked thereto. The right-hand rule also may be used to determine the polarity of any voltages produced in a winding as a result of flux change in the transfluxor linked by that winding.

Figure 2:
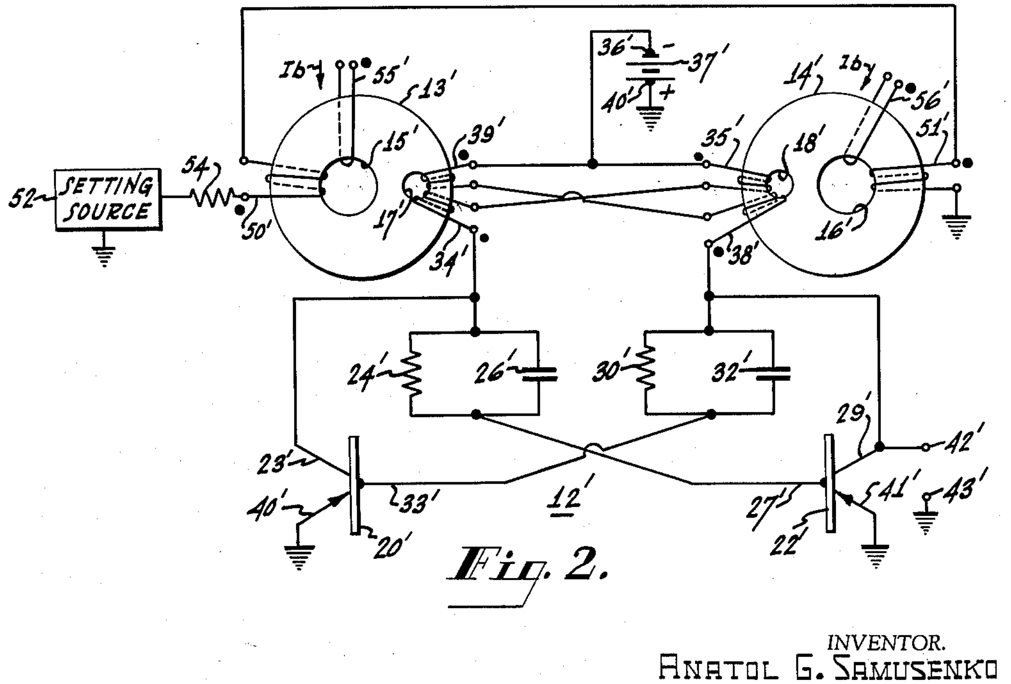
FIG. 2 is a schematic diagram of another embodiment control system according to the invention.

The senses of linkage of the various functional windings may be changed by connecting the setting windings 50, 51 in series-aiding relation to each other and connecting the two output windings of any pair in series-opposing relation with each other, as shown in FIG. 2. The remaining elements of the circuit of FIG 2 are similar to those of the circuit of FIG. 1 and like elements are designated by like reference numerals with the addition of a prime. Again, the two control windings 34′, 39′ are linked in mutually opposite senses to the transfluxor 13′, and the two control windings 35′, 38′ are linked in mutually opposite senses to the transfluxor 14′. This opposed linkage of the setting windings 50, 51 and the two series-connected pairs 34, 35 and 38, 39 of the control windings as shown in FIGS. 1 and 2 is termed herein a complementary linkage between the setting and control windings.

Details of the operation of a transfluxor are described in the above-referenced article by J. A. Rajchman and A. W. Lo. The remanent flux in a transfluxor can be set to any desired level within a continuous range including at one extreme the setting of all the flux in the narrow legs in the same one sense, with reference to the transfluxor output aperture. At the other extreme, all the flux in the narrow legs is set in mutually opposite sense, with respect to the output aperture. The one extreme level is termed a "fully set" condition of a transfluxor, and the other extreme level is referred to as a "blocked" condition. The transfluxors 13, 14 may be placed in their blocked conditions by applying a suitable blocking current, I*b*, to blocking windings 55, 56 linked through their setting apertures 15, 16, respectively, or by operating the setting source 52 to apply a suitable amplitude and polarity current to the setting circuit 53.

In the "fully set" condition, a current flowing in one of the control windings, for example, the control winding 34 or 39 of the transfluxor 13 reverses the flux in all portions of the narrow legs on either side of the output aperture 17. In the blocked condition, the same applied current does not produce any appreciable flux change in the narrow legs on either side of the output aperture 17. In the intermediate set levels, the same current flow in the control winding 34 reverses smaller amounts of flux in these narrow legs according to the set level. Similarly, current flow in one of the transfluxor 14 control windings 35 and 38 reverses an amount of flux determined by the set level of that transfluxor 14.

A description of the operation of a free-running, magnetic core-transistor oscillator, such as the oscillator 12, may be found in an article by A. J. Meyerhoff and R. M. Tillman, entitled "A High-Speed Two-Winding Transistor-Core oscillator," published in the Proceedings of the I.R.E., AIEE Conference on Transistor and Solid State Circuits, February 1957, pages 4–6.

Figure 3:
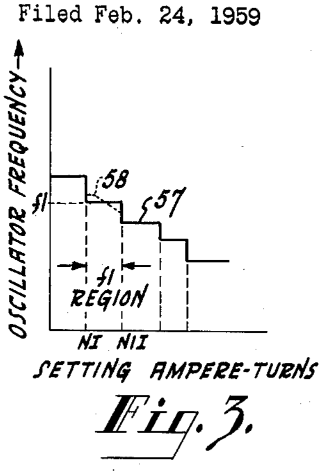
FIGS. 3 and 4 are each a graph useful in explaining the operation of the system of FIG. 1.

In operation, one of the transistors 20, 22 is fully conducting and the other is fully cut-off. The oscillator frequency depends on the time that the net self-induced voltage generated across the pair of control windings 34, 35, or 38, 39 associated with the "on," or conductive, transistor, can sustain the battery voltage 36. The relatively small voltage between the collector and ground of the "on" transistor can be neglected. When the self-induced voltage appearing across the pair of control windings connected to the "on" transistor starts to decrease, a regenerative action is started in which the "off" or non-conductive transistor 20, 22 is switched to full conduction and the previously "on" transistor 20, 22 is switched to full cut-off. The oscillator action then continues with the self-induced voltage of the other pair of control windings sustaining the battery voltage 36 during the next portion of the oscillator cycle. The duration of the self-induced voltage generated by the current flow in a pair of control windings depends essentially upon the amounts of flux than can be changed in the narrow legs adjacent the output apertures 17 and 18 of the transfluxors 13 and 14. Note that in the blocked condition, the flux change produced in a transfluxor is restricted to the so-called "elastic flux." By "elastic flux" is meant the small flux change between remanence and saturation in the same direction. As described in my above-referenced copending application, Serial No. 718,160, an oscillatory circuit using a single two-apertured control element exhibits a staircase type response curve to setting signals of varying amplitude. The staircase type curve is represented by the curve 57 of FIG. 3. The curve 57 of FIG. 3 is a plot, somewhat idealized, of oscillator output frequency versus setting signals, measured in ampere-turns, applied by the setting source. The curve 57 has regions of substantially constant output frequency over given ranges of setting ampere-turns. For example, the oscillator operates at a frequency *f*1 for values of setting signals between N1 and N1I ampere-turns. When the setting ampere-turns increase by a small amount above the value N1I, the oscillator frequency jumps to a new frequency. This new frequency is lower than the frequency *f*1 due to the increased setting of the transfluxor.

The dotted curve 58 of FIG. 3 is a plot of the operating frequency in one of the regions, say the region $f1$, of a single multi-apertured element circuit when the setting signals are removed. Note that the dotted curve 58 crosses the desired frequency $f1$ as the setting signals approach an optimum value of setting ampere-turns. Thus, by closely regulating the amplitude of setting signals, the oscillator can be set within a relatively close tolerance, say 1%, to a desired operating frequency.

Figure 4:
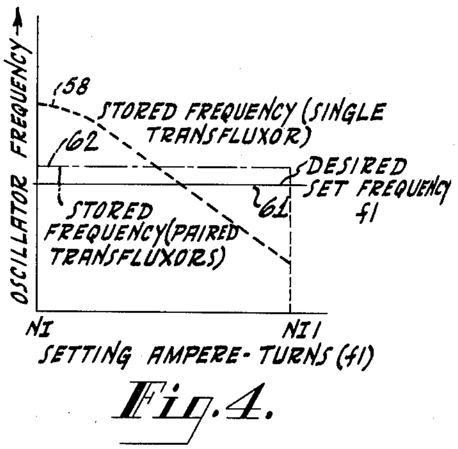

FIG. 4 is an expanded view of the region between the points N1 and NII of FIG. 3, with the solid horizontal line 60 representing the desired operating frequency $f1$, and the dotted curve 58 again corresponding to the operating frequency after the setting signals are removed. The dashed curve 62 of FIG. 4 represents the "stored" frequency of the circuit of FIG. 1 herein using a pair of multi-aperture elements. By stored frequency is meant the operating frequency after the setting signals are removed. Note that the "stored" frequency differs by approximately the same amount throughout the entire region of frequency $f1$. Thus, the setting signals need not be as carefully regulated to obtain a relatively precise operating frequency in the oscillating circuit 12 of FIG. 1 as is the case when a single multi-apertured element is used.

The circuit of FIG. 1 provides the same relative insensitivity to setting signal amplitude for each of the other operating regions of the characteristic curve 57 of FIG. 3. The internal mechanism by which the improved "stored" frequency characteristic 62 (FIG. 4) is obtained in a circuit arranged as in FIG. 1 is not understood. One explanation, however, is that the transient effects produced in the transfluxor 13 upon removal of the setting signals are compensated for by substantially equal and opposite transient effects produced at the same time in the transfluxor 14. Opposite transient effects are believed due to the opposite directions in which the transfluxors 13 and 14 are driven by the series-opposed setting windings 50, 51.

It is observed that when the setting windings 50, 51 and each of the pairs of control windings 34, 35, and 38, 39 are respectively connected to each other in the same one relation, for example, series-aiding relation, a stored characteristic frequency memory curve similar to the dotted curve 58 of FIG. 4 is obtained in each of the distinct operating regions. Thus, when all the like functional windings are connected in similar manner, the net effect is as though a single two-apertured element of increased volume were used. To obtain the insensitivity to setting signal amplitude, therefore, the complementary linkage between the setting and control windings is required.

The desired "memory" characteristic represented by the dotted curve 62 of FIG. 4 is obtained by coupling a plurality of multi-apertured elements in complementary fashion so to make the difference between the oscillatory circuit frequency during the presence and after the removal of the setting signals substantially equal to zero. Note that the two elements 13 and 14 need not be exactly matched to each other since the turns ratios of the various windings can be adjusted to provide different induced voltages. Also more than two elements may be used. For example, three elements (not shown) can be used, one arranged as is the element 13 of FIG. 1, and the other two arranged and interconnected to provide the effect of the element 14 of FIG. 1. Thus, in the case of three elements, the two other elements referred to above may have one-half the volume of material as used in the elements 14. The two other elements each may be the same as the element 14 and the turns of the various operating windings reduced, and so on. In summary, there are effectively two mutually compensating circuits coupled to the oscillatory circuit.

Figure 5:
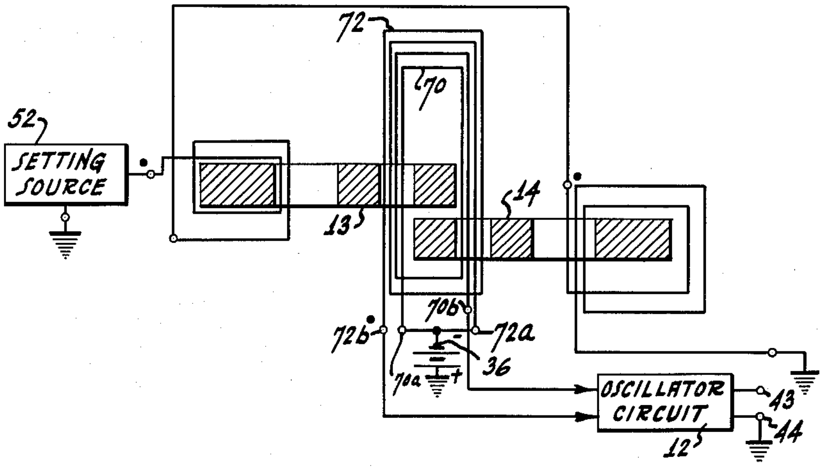
FIG. 5 is a schematic diagram of still another embodiment of the invention illustrating a different winding arrangement for coupling the magnetic elements and the oscillatory circuits.

The winding arrangement of the control windings may be simplified by placing the transfluxors 13 and 14 so that the narrow outside, output legs are superposed. As shown in FIG. 5, a single pair of control windings 70, 72 then are wound through the output apertures 17 and 18. For convenience of drawing, the transfluxors 13 and 14 are shown in cross-section. Elements in FIG. 5 similar to the elements of FIG. 2 are designated by the same reference numerals with the addition of a second prime. One end terminal 70*a*, 72*a* of each control winding 70, 72 is then connected to the negative supply terminal 36. The other end terminals 70*b*, 72*b* of the control windings, then are respectively connected to the oscillatory circuit. The setting windings 50'' and 51'' are connected in series-aiding relation and the control windings 70, 72 are connected in series-opposing relation, complementary to the connection of the setting circuit. The operation of the circuit of FIG. 5 is similar to that described for FIGS. 1 and 2.

There have been described herein improved control systems using multi-apertured magnetic elements and providing a continuous output signal determined by a momentarily applied setting signal.

What is claimed is:

1. A memory control system comprising a pair of cores of magnetic material having appreciable remanence, said cores each having first and second apertures, a setting circuit linked through said first apertures, first and second control circuits each linked through both said second apertures, said control circuits linking any one of said cores in mutually opposite senses, said setting circuit being linked to said cores in complementary relation with respect to said output circuits, and an oscillatory circuit regeneratively coupled to said control circuits.

2. A memory system as claimed in claim 1, said first and second control circuits comprising first and second control windings each linked through both said second core apertures.

3. A memory system as claimed in claim 1, said first control circuit including a first pair of control windings respectively wound through the said second apertures of said pair of cores and connected in series relation with each other, and said second control circuit including a second pair of control windings respectively wound through the said second apertures of said pair of cores and connected in series relation with each other.

4. A memory system comprising first and second cores of magnetic material having appreciable remanence, each of said cores having first and second apertures therein, a setting circuit linked through said first apertures in series-aiding relationship, a first control circuit linked through both said second apertures in series-opposing relationship, a second control circuit linked through both said second apertures in series-opposing relationship, said first and second control circuits further being linked in mutually opposite senses to any one of said cores, and an oscillatory circuit coupled in regenerative fashion to said first and second control circuits.

5. A memory system comprising first and second cores of magnetic material having appreciable remanence, said cores each having first and second apertures therein, a setting circuit linked through both said first apertures in series-opposing relation, a first control circuit linked through both said second apertures in series-aiding relation, a second control circuit linked through both said second apertures in series-aiding relation, said first and second control circuits being linked to any one of said cores in mutually opposite senses, and an oscillatory circuit coupled in regenerative fashion to said control circuits.

6. In a frequency memory system, the combination comprising a plurality of cores of magnetic material having appreciable remanence, said cores each having first and second apertures therein, a setting circuit linked through said first apertures of certain of said plurality of cores in one sense and linked through the said first apertures of the remaining of said plurality of cores in the same one sense, a first control circuit linked through said second apertures of said cores, said first control circuit being linked to said certain cores in one sense and to said remaining cores in the sense opposite said one sense, and a second control circuit linked through said second apertures, said second control circuit linking said certain cores in the sense opposite said one sense and linking said remaining cores in said one sense.

7. In a memory system, the combination as recited in claim 6, said first control circuit comprising a first control winding wound through said second apertures, and said second control circuit comprising a second control winding wound through said second aperture.

8. In a memory system, the combination as recited in claim 6, a plurality of first control windings each linked through said second apertures of a different one of said cores all said first control windings being connected in series with each other, and said second control circuit including a plurality of second control windings each linked through the said second aperture of a different one of said cores, all said second control windings being connected in series with each other.

9. In a memory system, the combination comprising first and second transfluxors each having first and second apertures, winding means through said first apertures for changing said transfluxors to a blocked condition and for selectively changing said transfluxors from said blocked condition to one of a plurality of distinct set conditions, and first and second circuits each linked through both said second apertures, said first and second circuits being linked in mutually opposite senses to said first transfluxor and in mutually opposite senses to said second transfluxor.

10. In a memory system the combination comprising a plurality of transfluxors each having first and second apertures, winding means linked through said first apertures for placing said transfluxors in a blocked condition and for selectively changing said transfluxors to one of a plurality of distinct set conditions, a first circuit linked through said second apertures of all said transfluxors, a second circuit linked through said second apertures of all said transfluxors, said first circuit being linked in one sense to certain of said plurality of transfluxors and in the opposite sense to the remaining of said transfluxors, said second circuit being linked in the sense opposite said one sense to said certain transfluxors and in said one sense to said remaining transfluxors, and said winding means being linked to said certain transfluxors in one of said two senses and to said remaining transfluxors in the opposite sense.

11. A memory system comprising a plurality of cores of magnetic material having appreciable remanence, said cores each having first and second apertures therein, setting means linked through all said first apertures, a first circuit linked to all said second apertures, and a second circuit linked through all said second apertures, said setting and said first and second circuits being linked in complementary relation to said cores, and said first and second circuits being linked in mutually opposite senses to any one of said cores.

12. A frequency memory system comprising first and second transfluxors, each having first and second apertures, means for placing said transfluxors in their blocked condition, setting means linked through said first apertures of all said transfluxors for placing said transfluxors in a desired one of a plurality of different set conditions, a first circuit linked through said second apertures of all said transfluxors, a second circuit linked through said second apertures of all said transfluxors, said setting means and said first and second circuits being linked to said transfluxors in complementary fashion, said first and second circuits being linked to any one of said transfluxors in mutually opposite senses, and an oscillatory circuit coupled in regenerative fashion to said first and second control circuits.

13. A frequency memory system as claimed in claim 12, said setting means being linked through said first and second transfluxors in series-aiding relation, and said first and second circuits being linked to said first and second transfluxors in series-opposing relation.

14. A frequency memory system as claimed in claim 12, said setting means being linked to said first and second transfluxors in series-opposing relation, and said first and second circuits being linked to said transfluxors in series-aiding relation.

References Cited in the file of this patent

UNITED STATES PATENTS

| | | |
|---|---|---|
| 2,803,812 | Rajchman | Aug. 20, 1957 |
| 2,811,639 | Sontheimer | Oct. 29, 1957 |
| 2,839,684 | Smith-Vaniz | June 17, 1958 |
| 2,854,580 | Urchin | Sept. 30, 1958 |
| 2,897,352 | Smith-Vaniz | July 28, 1959 |
| 2,911,630 | Dinowitz | Nov. 3, 1959 |